US009836167B2

(12) United States Patent
Trend et al.

(10) Patent No.: US 9,836,167 B2
(45) Date of Patent: Dec. 5, 2017

(54) ELECTRODE LAYOUT FOR TOUCH SCREENS

(75) Inventors: Matthew Trend, Fareham (GB); Samuel Brunet, Cowes (GB); Esat Yilmaz, Chandler's Ford (GB)

(73) Assignee: Atmel Corporation, San Jose ( * ) Notice: Subject to any disclaimer, the term of this patent is extended or adjusted under 35 U.S.C. 154(b) by 366 days.

(21) Appl. No.: 12/534,748

(22) Filed: Aug. 3, 2009

(65) Prior Publication Data

US 2011/0025639 A1   Feb. 3, 2011

(51) Int. Cl.
*G06F 3/041* (2006.01)
*G06F 3/044* (2006.01)

(52) U.S. Cl.
CPC .................... *G06F 3/044* (2013.01)

(58) Field of Classification Search
CPC .................. G06F 3/041; G06F 3/044; G06F 2203/04103; G06F 2203/04111
USPC ........ 345/173–178; 178/18.01, 18.03, 18.06, 178/19.01, 19.03; 324/660, 662, 663, 686
See application file for complete search history.

(56) References Cited

U.S. PATENT DOCUMENTS

| | | | | |
|---|---|---|---|---|
| 5,933,102 A * | 8/1999 | Miller et al. | ................... | 341/33 |
| 6,140,975 A * | 10/2000 | Cohen | ........................... | 343/846 |
| 6,147,680 A * | 11/2000 | Tareev | ........................ | 345/173 |
| 6,297,811 B1 * | 10/2001 | Kent et al. | ..................... | 345/173 |
| 6,870,507 B2 * | 3/2005 | Anguera Pros et al. | ..... | 343/700 MS |
| 6,970,160 B2 * | 11/2005 | Mulligan et al. | ............. | 345/173 |
| 7,019,765 B2 * | 3/2006 | Fujiwara | .............. | G01D 5/2405 178/18.01 |
| 7,129,935 B2 * | 10/2006 | Mackey | ........................ | 345/174 |
| 7,245,196 B1 * | 7/2007 | Baliarda et al. | .............. | 333/219 |
| 7,663,607 B2 | 2/2010 | Hotelling et al. | | |
| 7,864,160 B2 * | 1/2011 | Geaghan et al. | ............. | 345/173 |
| 7,864,503 B2 | 1/2011 | Chang | | |
| 7,875,814 B2 | 1/2011 | Chen et al. | ................ | 178/18.07 |
| 7,920,129 B2 | 4/2011 | Hotelling | | |
| 8,031,094 B2 | 10/2011 | Hotelling et al. | | |
| 8,031,174 B2 | 10/2011 | Hamblin et al. | | |
| 8,040,326 B2 | 10/2011 | Hotelling et al. | ............ | 345/173 |
| 8,049,732 B2 | 11/2011 | Hotelling | | |
| 8,134,541 B2 * | 3/2012 | Chen | ....................... | G06F 3/044 178/18.06 |
| 8,159,467 B2 * | 4/2012 | Gray et al. | ..................... | 345/173 |
| 8,179,381 B2 | 5/2012 | Frey et al. | .................... | 345/174 |

(Continued)

FOREIGN PATENT DOCUMENTS

CN     1754141 A    3/2006
CN     1754141 A    3/2006

(Continued)

OTHER PUBLICATIONS

U.S. Appl. No. 61/454,936, filed Mar. 21, 2011, Myers.

(Continued)

*Primary Examiner* — Jason Mandeville
(74) *Attorney, Agent, or Firm* — Baker Botts L.L.P.

(57) ABSTRACT

A device includes a plurality of drive electrodes and a plurality of sense electrodes. The drive electrodes run generally in a first direction and have multiple projections along their length. The sense electrodes run generally in a second direction transverse to the drive electrodes. The sense electrodes have multiple projections interleaved with the multiple projections of the drive electrodes.

25 Claims, 7 Drawing Sheets

(56) References Cited

U.S. PATENT DOCUMENTS

| | | | |
|---|---|---|---|
| 8,217,902 B2 | 7/2012 | Chang | |
| 8,711,121 B2* | 4/2014 | Gray | G06F 3/0416 |
| | | | 178/18.01 |
| 8,830,180 B2* | 9/2014 | Yilmaz | G01D 5/2405 |
| | | | 345/173 |
| 9,116,586 B2* | 8/2015 | Yilmaz | G06F 3/044 |
| 9,634,660 B2* | 4/2017 | Trend | G06F 3/044 |
| 2003/0102875 A1* | 6/2003 | Fujiwara | G01D 5/2405 |
| | | | 324/663 |
| 2003/0156065 A1* | 8/2003 | Jo et al. | 343/700 MS |
| 2004/0119701 A1 | 6/2004 | Mulligan et al. | |
| 2007/0008299 A1* | 1/2007 | Hristov | 345/173 |
| 2007/0074914 A1* | 4/2007 | Geaghan | G06F 3/044 |
| | | | 178/18.06 |
| 2007/0273560 A1* | 11/2007 | Hua et al. | 341/33 |
| 2008/0277259 A1* | 11/2008 | Chang | G06F 3/044 |
| | | | 200/600 |
| 2008/0278178 A1 | 11/2008 | Philipp | |
| 2008/0309635 A1 | 12/2008 | Matsuo | |
| 2009/0084613 A1* | 4/2009 | Yang | G06F 3/044 |
| | | | 178/18.06 |
| 2009/0315854 A1 | 12/2009 | Matsuo | 345/174 |
| 2010/0079393 A1* | 4/2010 | Dews | 345/173 |
| 2010/0149110 A1* | 6/2010 | Gray | G06F 3/0416 |
| | | | 345/173 |
| 2010/0164889 A1* | 7/2010 | Hristov et al. | 345/173 |
| 2011/0157079 A1* | 6/2011 | Wu et al. | 345/174 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2013/0076612 A1 | 3/2013 | Myers | |

FOREIGN PATENT DOCUMENTS

| | | |
|---|---|---|
| CN | 101349960 A | 1/2009 |
| CN | 101477430 A | 7/2009 |
| TW | 200712998 | 7/2007 |
| WO | WO 2008/122759 A1 | 10/2008 |
| WO | WO 2012/129247 | 9/2012 |

OTHER PUBLICATIONS

U.S. Appl. No. 61/454,950, filed Mar. 21, 2011, Lynch.

U.S. Appl. No. 61/454,894, filed Mar. 21, 2011, Rothkopf.

State Intellectual Property Office of the People's Republic of China, Chinese Office Action and Search Report and English Translation of Text of the First Office Action and Search Report, Application No. 201010246072.6, dated Nov. 28, 2013 (21 pages), Nov. 28, 2013.

State Intellectual Property Office of the People's Republic of China, Chinese Office Action and Search Report and English Translation of Text of the Second Office Action and Search Report, Application No. 201010246072.6; Ref. 2014071501065370, dated Jul. 18, 2014, and reported Jul. 29, 2014 (25 pages) date of issuance July 18, 2014.

State Intellectual Property Office of the People's Republic of China, Chinese Office Action and English Translation of Text of the Third Office Action, Application No. 201010246072.6; dated Feb. 6, 2015, and reported Mar. 12, 2015 (22 pages) Reporting Date: Mar. 12, 2015.

Intellectual Property Office of the People's Republic of China, Taiwan Office Action and English Translation of Text and Search Report; Taiwan Patent Application No. 09912458; dated Jan. 19, 2015, and reported Mar. 11, 2015 (20 pages). Reporting Date: Mar. 11, 2015.

* cited by examiner

ELECTRODE LAYOUT FOR TOUCH SCREENS

BACKGROUND

Touchscreen displays are able to detect a touch such as by a finger or stylus within an active or display area. Use of a touchscreen as part of a display enables a user to interact with an electronic application by touching the touchscreen. The display may present images to the user. Such images may include user interface constructs such as different buttons, images, or other regions that can be selected, manipulated, or actuated by touch. Touchscreens can therefore provide an effective user interface for cell phones, GPS devices, personal digital assistants (PDAs), computers, ATM machines, and other such devices.

In capacitive sensor based, a touch changes a capacitance at a node in an array of electrodes overlaying the display device. There are several different types of capacitive touchscreens, such as mutual and self capacitance types. Self capacitance type touchscreens measure the change of capacitance on a row or column. Mutual capacitance type touchscreens measure the change of capacitance on a node.

Capacitive touchscreens often use two separate layers of transverse electrodes separated by a dielectric. The intersections of the transverse electrodes form the nodes, and are individually accessed to determine the location of one or more touches. Transparent electrodes such as indium tin oxide (ITO) or transparent conductive polymers may be used to form the array of nodes. Other layouts of electrodes may utilize non-overlapping patterns of electrodes, such as triangle and bar patterns and diamond patterns to minimize interference from an underlying liquid crystal display (LCD). Some touchscreens utilize a single layer layout.

In some two layer touchscreen designs, touches are detected utilizing a quantum charge acquisition method. Drive electrodes may be driven with pulses of electricity, and sense electrodes collect charge transferred from the drive electrode. The amount of charge transferred per pulse varies as a function of where the screen is touched, allowing detection of the location of the touch.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

A touchscreen has sets of electrodes with interleaved projections that increase a shared perimeter between the electrodes. Various embodiments include multilayer layouts of the electrodes and single layer layouts. A quantum charge acquisition method may be used to detect touches on the touchscreen. The quantum charge acquisition method involves using pulses to drive emitter electrodes and obtaining and measuring charge obtained from receiver electrodes. In one embodiment, the electrodes form a mutual capacitance based touchscreen. The electrode layouts may also be used with self capacitance touchscreens.

A touchscreen as used herein includes one or more layers of electrodes to form devices responsive to touch by a user's finger or a pointing device, such as a stylus. The touchscreen may include transparent electrodes or opaque electrodes, and further may include a display device, such as a liquid crystal display or other display device. Such touchscreens may be used in telephones, kiosks, ATMs, home appliances, and in countless other devices.

Figure 1:
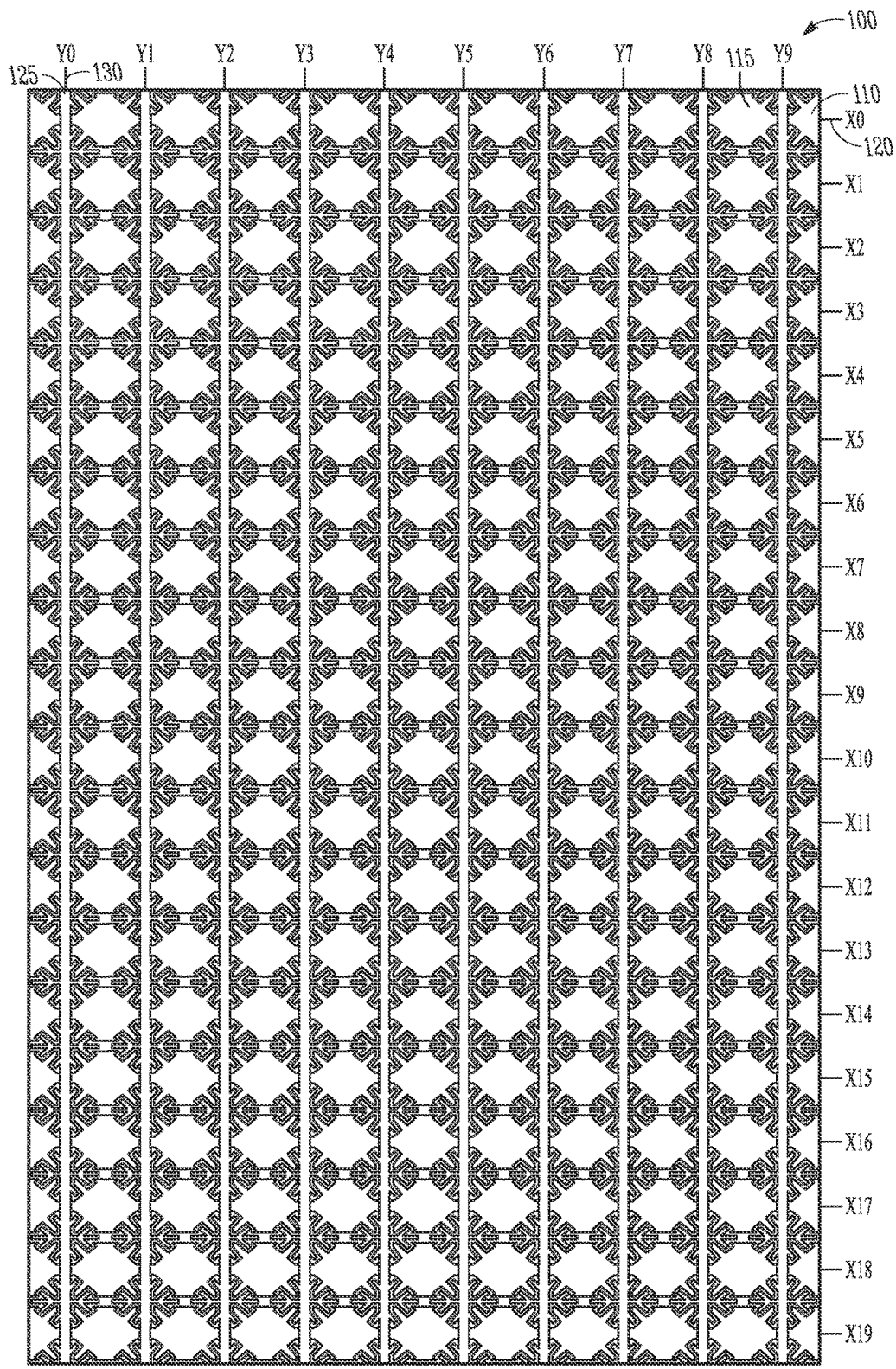
FIG. 1 is a block schematic diagram of a touchscreen electrode layout with interleaved electrode projections according to an example embodiment.

FIG. 1 is a block schematic diagram of a touchscreen 100 electrode layout with interleaved electrode projections according to an example embodiment. A drive electrode 110 runs in a first direction across the touchscreen as shown. In one embodiment, the drive electrode includes a plurality of portions, such as diamonds 115 that are interconnected. In one embodiment, the diamonds 115 have projections that are shown in further detail in FIG. 2.

Drive electrode 110 is coupled to a drive line 120, that receives drive signals from a controller. Drive electrodes may be referred to as emitter electrodes, and are generally an electrode that is driven by suitable control electronics in a switched manner. Twenty drive electrodes and corresponding drive lines are shown in FIG. 1, and in one embodiment, all run substantially parallel to each other in the first direction, forming an array of diamond shapes. In one embodiment, the diamond shaped portions of the drive electrodes provide a high surface area conductive surface to facilitate charge retention and transfer.

A receive electrode 125 is shown running in a second direction transverse to the drive electrode 110. Receive electrode 125 in one embodiment is a bar or line that in some embodiments runs substantially transverse to the drive electrodes, forming a uniform grid of diamond shaped portions of the drive electrodes separated by the receive electrodes. In one embodiment, the receive electrode 125 has projections that are shown in further detail in FIG. 2. Receive electrode 125 is coupled to a receive line 130, that is coupled to circuitry to measure the amount of charge received on the receive electrode 125 from one or more drive electrodes. The receive electrodes may also be referred to as sense electrodes. There are 10 receive electrodes and receive lines in FIG. 1, each running transverse to the drive electrodes. In one embodiment, the drive and receive electrodes are substantially orthogonal to each other.

Figure 2:
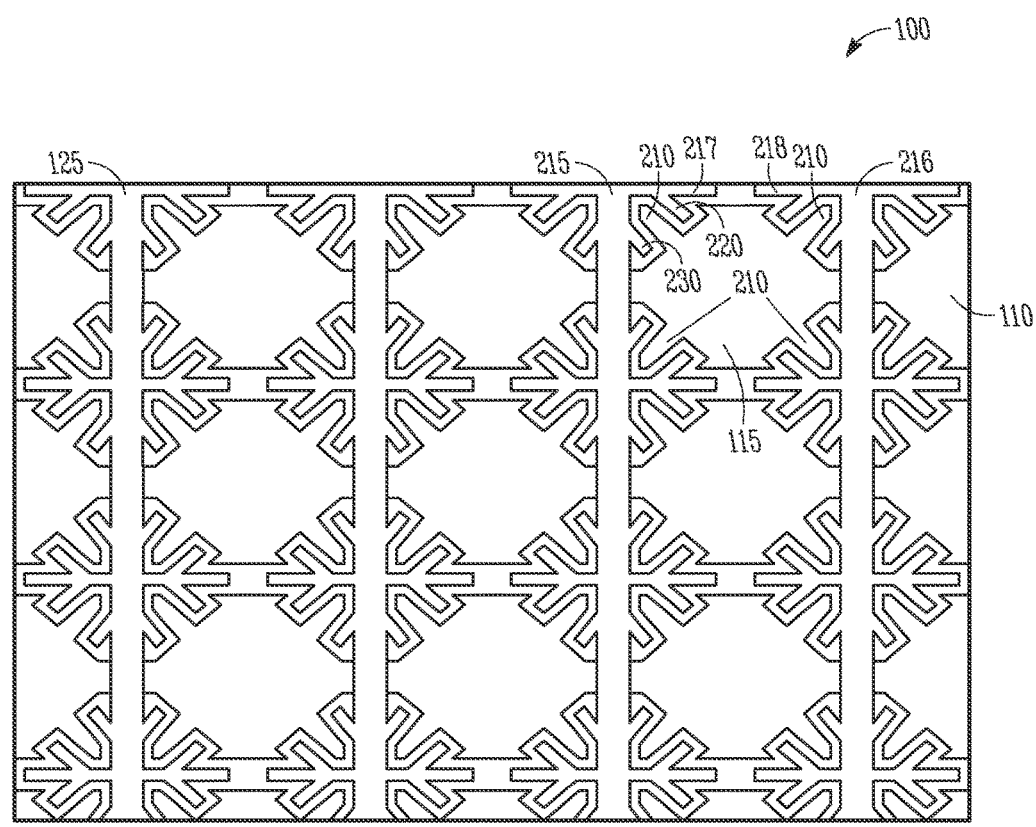
FIG. 2 is a block schematic diagram of a portion of the layout of FIG. 1 to show further details of the interleaved projections according to an example embodiment.

FIG. 2 is a block schematic diagram of a portion of the touchscreen electrode layout of FIG. 1 to show further details of the interleaved projections according to an example embodiment. Diamond 115 is shown as having four projections 210, one extending from each of four sides of the diamond shape. Two receive electrodes 215 and 216 are shown as running on opposite sides of diamond 115. The receive electrodes have cross portions 217 and 218 respectively coupled to form a "T" shape at an outer edge of the touchscreen 100. The cross portions run substantially orthogonal to the receive electrodes, with a gap between them such that each receive electrode can be independently sensed by the controller.

In one embodiment, each side of the cross portions 217 and 218 have a projection 220 that is adjacent corresponding projection 210 on diamond 115. The receive electrodes also have projections 230 extending from them adjacent the other side of the projections 210. The pattern of cross bars and projections is repeated across the array or matrix of electrodes, such that each side of the diamond has projections with one or more adjacent projections from the receive electrodes or crossbars of the receive electrodes. The combination of electrodes with projections may be referred to as interdigitated or interleaved projections that increase the adjacent perimeters of the electrodes. Since electric fields may concentrate on edges of electrode shapes, field interactions are believed to be increased by increasing the shared perimeter of the electrodes.

In one embodiment, the pattern of interdigitated projections from each of the electrodes is referred to as a snowflake pattern. Just as with snowflakes, there are many different electrode patterns of projections and electrode portion shapes that may be used to increase the shared perimeter. Rather than diamond electrode portion shapes, boxes, rectangles or other shapes may be used to form a drive electrode.

In some embodiments, the projections from both the drive and receive electrodes may be of the same width, such as from 0.25 to 0.5 mm in one embodiment, but may vary significantly in further embodiments. The variations in size may be a function of process and material limits in some embodiments. With ITO on polyethylene terephthalate (PET) as the conductive material of the electrodes, the resistance of the projections increases with decreasing line width, which may result in longer charge transfer times. With other, more conductive materials such as copper, the width of the projections may be much narrower before the resistance may become problematic. In some embodiments, narrower projection widths allow for the use of more projections in the layout, increasing the shared perimeter and corresponding improved charge transfer characteristics. This would result in a touching object drawing away more charge, thus increasing the overall sensitivity of the touchscreen.

In one embodiment, the receive lines are approximately 2.5 mm in width, and the diamond shapes are approximately 4 to 5 mm from edge to edge. These dimensions may be based on the average shape of a finger footprint on the touchscreen. If larger pointing objects are used, the dimensions may be correspondingly increased if desired.

In one embodiment, the drive and receive electrodes are formed on different layers, separated by a dielectric layer. The drive electrodes may be formed closer to a display device in one embodiment. In further embodiments, the drive and receive electrodes may be formed on the same layer, except for crossover points, where one of the electrodes is formed over the other electrode, separated by an insulative layer. This crossover structure may be formed by removing material from one electrode at both sides of the crossover points, forming the insulative layer, and then reconnecting the electrode from which the material was removed at each crossover point. Such single layer electrode patterns may be referred to as co-planar, and may be formed on glass in one embodiment.

Figure 3:
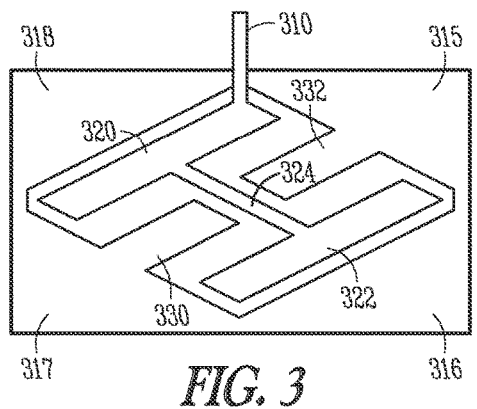
FIG. 3 is a block schematic diagram of a portion of an alternative layout having interleaved projections according to an example embodiment.

FIG. 3 is a block schematic diagram of a portion of an alternative layout having interleaved projections according to an example embodiment. A receive electrode 310 shown surrounded by portions of drive electrodes 315, 316, 317, and 318. The receive electrode 310 is formed in somewhat of an "H" shape, having two lateral portions 320, 322 connected by a cross portion 324. The "H" shape may be referred to as a set of projections in one embodiment, and are interleaved with projections 330 and 332 extending from drive electrodes 315 and 317. The projections 330 and 332 in one embodiment extend between the lateral portions 320 and 322 toward the cross portion 324 of the "H" shape. The pattern provides an increased adjacent shared perimeter between the electrodes. Different portions of the projections may have different widths. It should be noted that some of the drive electrodes do not have projections in this embodiment. The pattern may be repeated across the matrix of electrodes.

Figure 4:
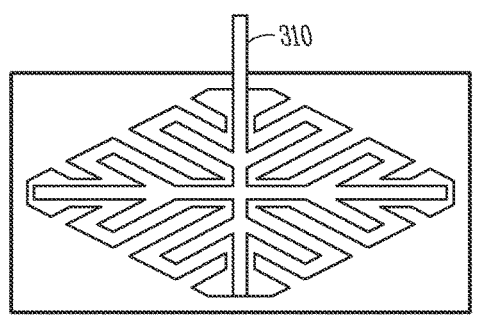
FIG. 4 is a block schematic diagram of a portion of an alternative layout having interleaved projections according to an example embodiment.

FIG. 4 is a block schematic diagram of a portion of an alternative layout having interleaved projections according to an example embodiment. In this embodiment, the drive electrodes each have multiple projections interleaved with one projection directly from a receive electrode and one projection from each cross bar of the receive electrode. The shared adjacent perimeter of the electrodes is further increased in this embodiment.

Figure 5:
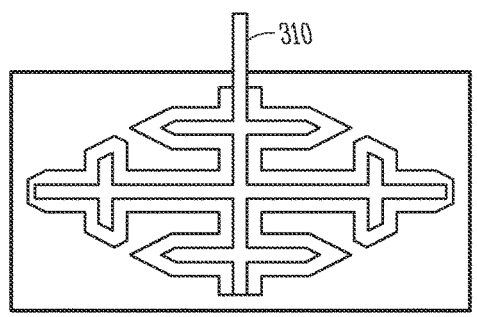
FIG. 5 is a block schematic diagram of a portion of an alternative layout having interleaved projections according to an example embodiment.

FIG. 5 is a block schematic diagram of a portion of an alternative layout having interleaved projections according to an example embodiment. In this embodiment, the receive electrode has projections that run substantially orthogonal to a main body of the receive electrode and further projections running substantially orthogonal to cross bars of the receive electrode. Projections from the drive electrodes are formed of different shapes to fill in areas between the projections, again, resulting in an increase in shared adjacent perimeter between the electrodes. In this embodiment, the projections from the receive electrode may have pointed ends.

Figure 6:
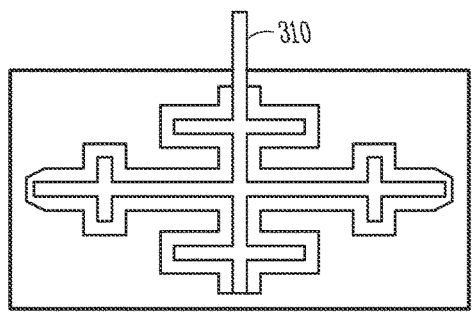
FIG. 6 is a block schematic diagram of a portion of an alternative layout having interleaved projections according to an example embodiment.

FIG. 6 is a block schematic diagram of a portion of an alternative layout having interleaved projections according to an example embodiment. This layout is similar to that in FIG. 5, with the ends of the projections being squared off.

Figure 7:
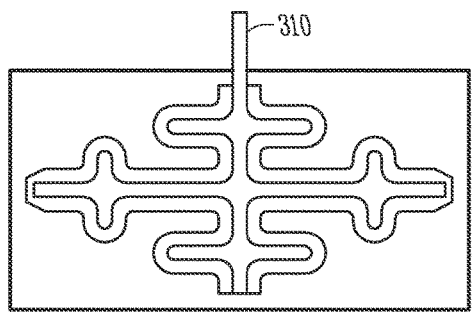
FIG. 7 is a block schematic diagram of a portion of an alternative layout having interleaved projections according to an example embodiment.

FIG. 7 is a block schematic diagram of a portion of an alternative layout having interleaved projections according to an example embodiment. This layout is similar to that of FIG. 5, with ends of the projections being rounded.

Figure 8:
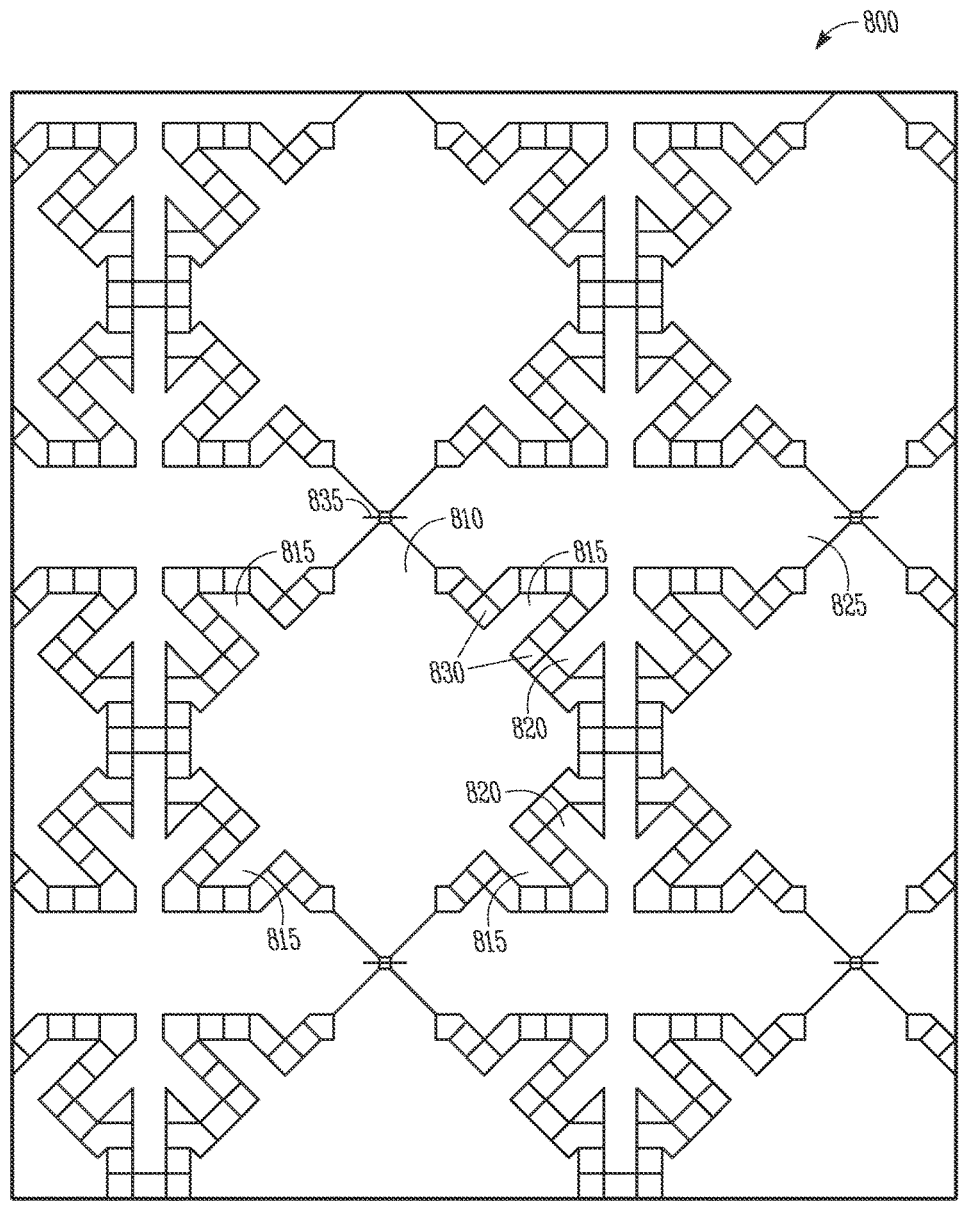
FIG. 8 is a block schematic diagram of a portion of an alternative layout having interleaved projections and isolated fill areas according to an example embodiment.

FIG. 8 is a block schematic diagram of a portion of an alternative layout 800 having interleaved projections and isolated fill areas according to an example embodiment. Layout 800 includes diamond shaped drive electrodes such as drive electrode 810 having multiple projections 815 that are interleaved with projections 820 from sense electrodes such as sense electrode 825. In one embodiment, isolated fill areas 830 are disposed between adjacent interleaved projections and other areas of adjacent portions of the electrodes. The fill areas 830 may be formed of the same conducting material as the electrodes, but are electrically isolated from the electrodes. The fill areas comprise polygons, such as squares, rectangles, triangles and pentagons in this embodiment. The shape used in any particular area may be selected to fill the space between the adjacent electrodes. In one embodiment, the fill areas may help to minimize visibility of the patterns to a user.

In one embodiment, the drive electrodes 810 and sense electrodes 825 are formed on the same level. Each receive or sense electrode 825 in FIG. 8 is formed in sections between intersections of the diamond shaped portions of drive electrode 810. The sections are coupled to each other by a thin metal track 835 in one embodiment. The track may be 10 um or less in some embodiments to reduce their visibility, and may be separated from portions of the drive electrode by an insulator material.

Figure 9:
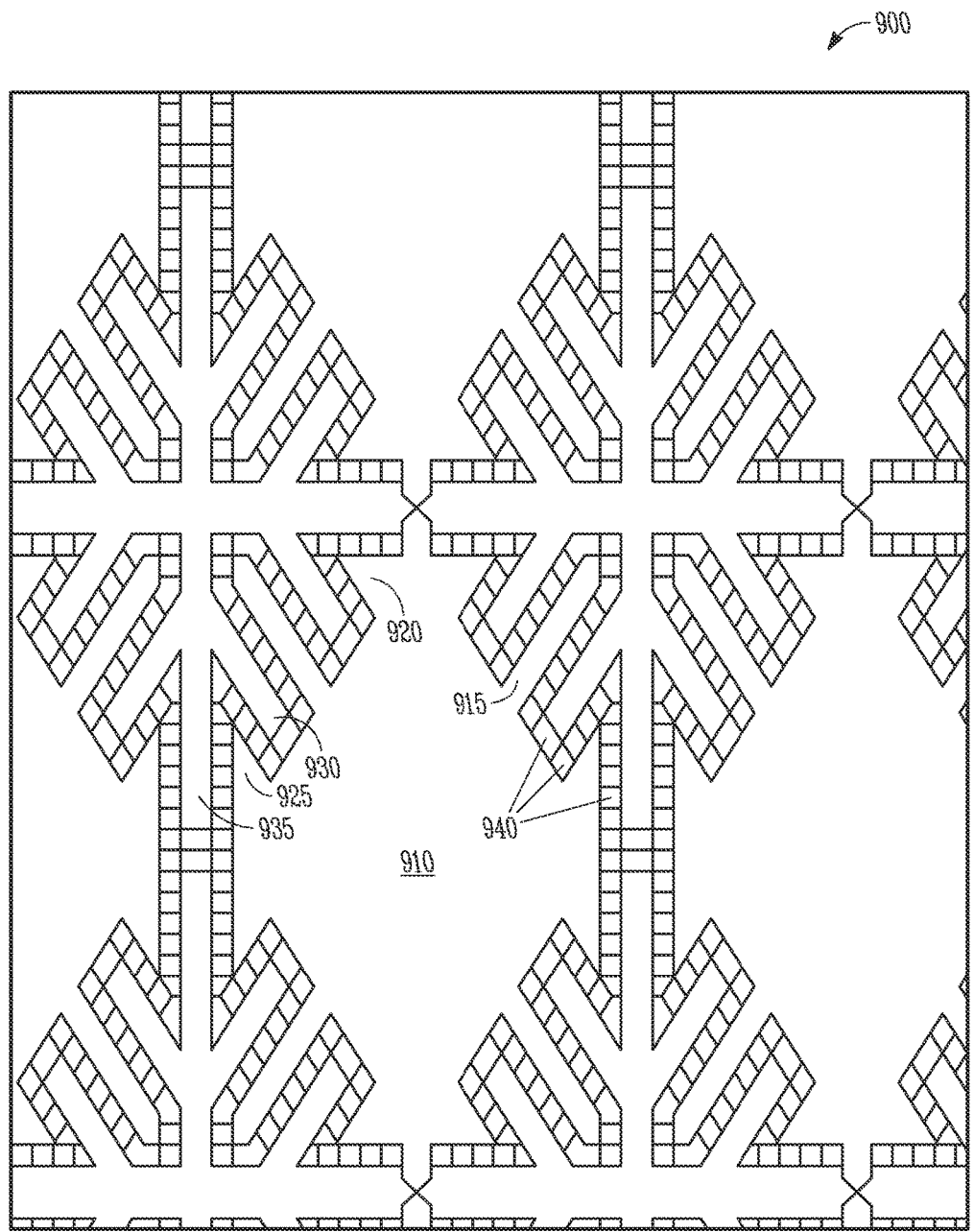
FIG. 9 is a block schematic diagram of a portion of an alternative layout having interleaved projections and isolated fill areas according to an example embodiment.

FIG. 9 is a block schematic diagram of a portion of an alternative layout 900 having interleaved projections and isolated fill areas according to an example embodiment. Layout 900 includes drive electrode portions such as drive electrode portion 910 having multiple projections 915, 920, 925 that are interleaved with projections 930 from sense electrodes such as sense electrode 935. Note that the projections 920 and 925 are partially triangular in shape adjacent projections 930, rather than the narrower projections 915. Such projection shapes may be a function of the relative spacing of the electrodes, and the shape of the drive electrode portions, such as a diamond shaped or rectangular shaped drive electrode portion 910. Electrode portion 910 is more diamond shaped, with receive electrode portions 930 projecting into the electrode portion 910, resulting in an increased adjacent perimeter between the electrodes.

In one embodiment, isolated fill areas 940 are disposed between adjacent interleaved projections and other areas of adjacent portions of the electrodes. The fill areas 940 may be formed of the same conducting material as the electrodes, but are electrically isolated from the electrodes. The fill areas comprise polygons, such as squares, rectangles, triangles and pentagons in this embodiment. The shape used in any particular area may be selected to fill the space between the adjacent electrodes. In one embodiment, the fill areas may help to minimize visibility of the patterns to a user.

Figure 10:
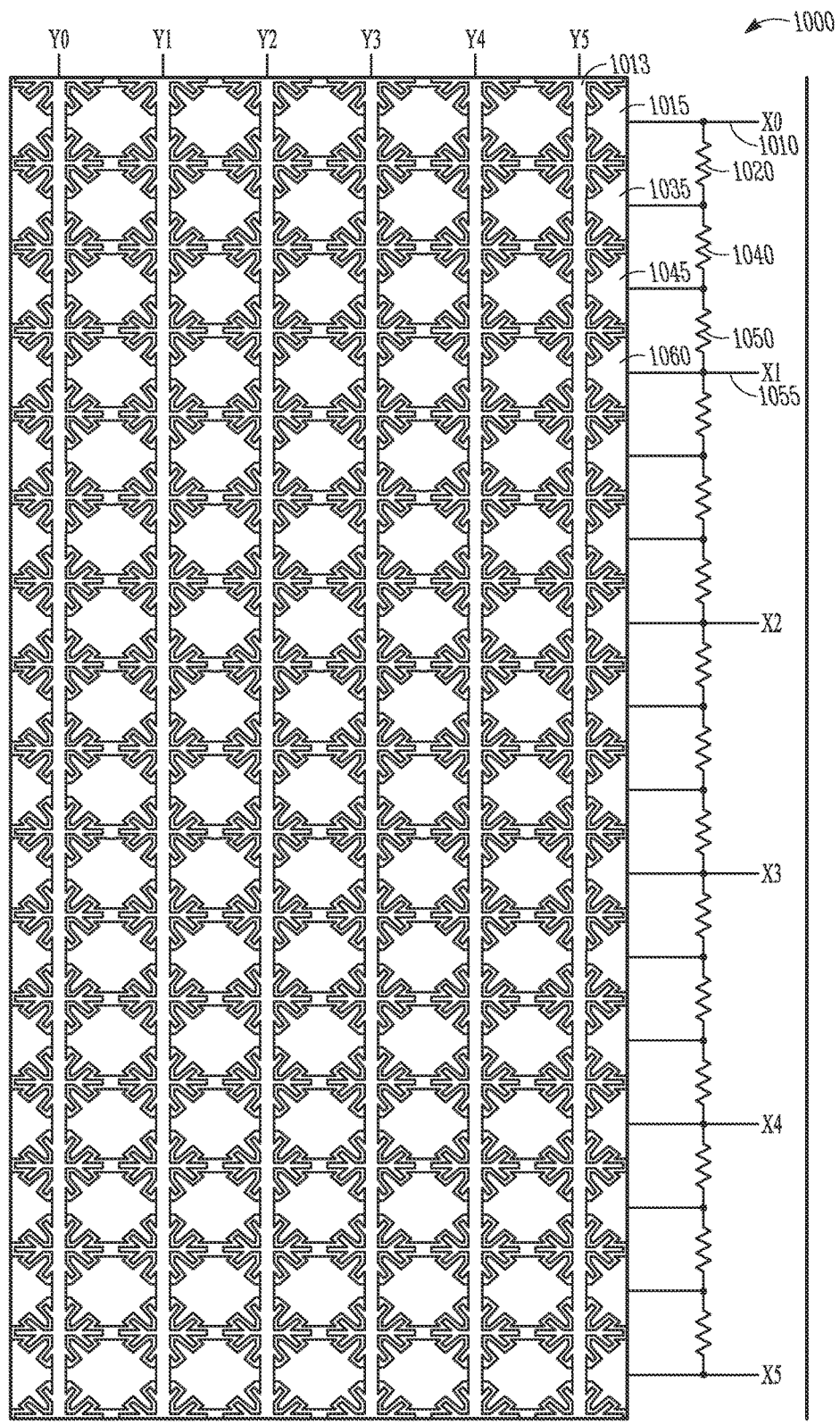
FIG. 10 is a block schematic diagram of a touchscreen electrode layout with interleaved electrode projections and resistive interpolation according to an example embodiment.

FIG. 10 is a block schematic diagram of a touchscreen 1000 electrode layout with interleaved electrode projections and resistive interpolation according to an example embodiment. The layout is very similar to the layout 100 in FIG. 1, with fewer drive lines 1010, coupled directly to a drive electrode 1015 having portions with increased surface area separated by receive electrodes 1013. In one embodiment, the portions of the drive electrode may be diamond shaped, rectangular shaped or formed in other shapes as desired. Drive line 1010 is coupled through a resistor 1020 to an interpolated drive electrode 1035. A resistor 1040 is coupled to resistor 1020 and to drive electrode 1045. A further drive line 1055 is coupled directly to a drive electrode 1060 and via a resistor 1050 to drive electrode 1045 and resistor 1040. The combination of drive lines and resistors provide two interpolated drive electrodes per drive line coupled via a resistive ladder.

Each drive electrode receives signals from driven electrodes that are reduced by the resistive ladder that extends between drive line 1010 through six drive lines. At any one time, one drive line is driven and all others are grounded. For example, if drive line 1010 is driven, drive line 1055 along with the other drive lines would be grounded. When drive line 1010 is driven, because of the resistive ladder, interpolated drive electrode 1035 would have $\frac{2}{3}^{rds}$ the voltage of drive electrode 1015, and interpolated drive electrode 1045 would have $\frac{1}{3}^{rd}$ the voltage. The resistors 1020, 1040, and 1050 have the same resistance in one embodiment. Both the drive electrodes and the receive electrodes may have interleaved or interdigitated projections to increase the adjacent perimeter of the electrodes.

Figure 11:
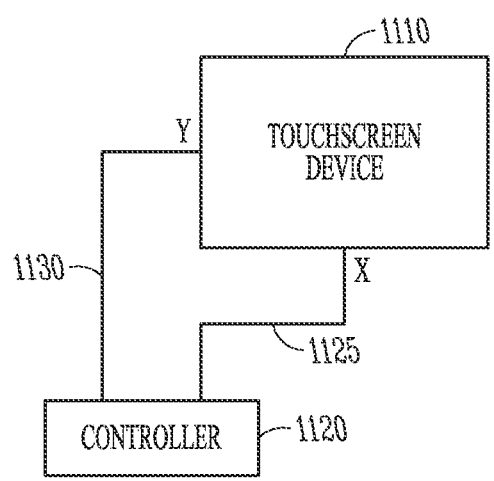
FIG. 11 is a block diagram of a touchscreen device coupled to a controller according to an example embodiment.

FIG. 11 is a block diagram of a touchscreen device 1110 coupled to a controller 1120 according to an example embodiment. Drive electrodes of touchscreen device 1110 are coupled via drive lines 1125 to controller 1120. The drive lines are driven by pulses of electricity under control of controller 1120. Controller 1120 also controls reception of information from the receive electrodes via line 1130. Charge detected on the receive electrodes is converted to digital form and is representative of touches on the touchscreen device 1110. In one embodiment, the electrodes are controlled in a switched manner consistent with a quantum charge acquisition method. An analog to digital converter may be used to convert the sensed charge from the receive electrodes into a digital form for use by the controller 1120. Other methods to convert the sensed charge may be used in further embodiments. Touchscreen device 1110 may also include a display device formed beneath the electrodes.

The invention claimed is:

1. A touchscreen device comprising:
a plurality of drive electrodes extending generally in a first direction, each of the drive electrodes comprising:
a plurality of diamond-shaped first portions, each diamond-shaped first portion connected to an adjacent diamond-shaped first portion in the first direction by at least one second portion extending from at least one end of each diamond-shaped first portion,
wherein each of the plurality of diamond-shaped first portions comprises a first plurality of projections, each projection of the first plurality of projections extending orthogonally from a respective side of a respective one of the diamond-shaped first portions; and
a plurality of receive electrodes extending generally in a second direction transverse to the first direction, each of the receive electrodes comprising:
a bar extending generally in the second direction, the bar crossing over one second portion of each of the plurality of drive electrodes that connects adjacent diamond-shaped first portions in the first direction to form a uniform grid of diamond-shaped first portions of the plurality of drive electrodes,
wherein the bar comprises a plurality of cross bars extending at regular intervals in opposite directions away from the bar in the first direction such that each of the plurality of cross bars is disposed above a diamond-shaped first portion of one of the plurality of drive electrodes, below a diamond-shaped first portion of one of the plurality of drive electrodes, or between diamond-shaped first portions of two of the plurality of drive electrodes; and
a second plurality of projections, each of the second plurality of projections extending from the bar and from each of the plurality of cross bars, wherein the bar, the plurality of cross bars, and the plurality of second projections form a snowflake pattern in the uniform grid of diamond-shaped first portions of the plurality of drive electrodes, wherein the second plurality of projections comprises a plurality of first pairs of projections, each of the first pairs of projections extending from a first side of the bar at regular intervals, a plurality of second pairs of projections, each of the second pairs of projections extending from a second side of the bar at regular intervals, a plurality of third pairs of projections, each of the third pairs of projections extending from opposite sides of each of a first plurality of the plurality of cross bars, and a plurality of fourth pairs of projections, each of the fourth pairs of projections extending from opposite sides of each of a second plurality of the plurality of cross bars, such that the first, second, third, and fourth pairs of projections are respectively disposed above respective diamond-shaped first portions of one of the plurality of drive electrodes, below respective diamond-shaped first portions of one of the plurality of drive electrodes, or between respective diamond-shaped first portions of two of the plurality of drive electrodes, and each projection of the first plurality of projections of each of the plurality of diamond-shaped first portions is interleaved between two projections of the second plurality of projections.

2. The device of claim 1 wherein, in plan view, the plurality of drive electrodes and the plurality of receive electrodes are substantially non-overlapping.

3. The device of claim 1 and further comprising a plurality of fill areas, a first fill area respectively separating, in plan view, the first plurality of projections of each of the drive electrodes and the second plurality of projections of each of the plurality of receive electrodes.

4. The device of claim 3 wherein the plurality of fill areas are electrically isolated from each other and from the plurality of drive electrodes and the plurality of receive electrodes.

5. The device of claim 4 wherein the plurality of fill areas, drive electrodes and receive electrodes are formed of the same material.

6. The device of claim 1 wherein, in plan view, the first plurality of projections and the second plurality of projections provide an increased adjacent perimeter between a first drive electrode and a first receive electrode.

7. The device of claim 1 wherein the plurality of drive electrodes and the plurality of receive electrodes are formed of indium tin oxide.

8. The device of claim 1 wherein the plurality of drive electrodes includes at least one resistively interpolated drive electrode.

9. The device of claim 1 wherein the plurality of drive electrodes are disposed in a drive electrode layer and the plurality of receive electrodes are disposed in a receive electrode layer, and further comprising an intermediate dielectric layer disposed between the drive electrode layer and the receive electrode layer.

10. A touchscreen device comprising:
a plurality of drive electrodes extending generally in a first direction, each of the drive electrodes comprising:
a plurality of diamond-shaped first portions, each diamond-shaped first portion connected to an adjacent diamond-shaped first portion in the first direction by at least one second portion extending from at least one end of each diamond-shaped first portion, wherein each of the plurality of diamond-shaped first portions comprises a first plurality of projections, each projection of the first plurality of projections extending orthogonally from a respective side of a respective one of the diamond-shaped first portions; and a plurality of receive electrodes extending generally in a second direction transverse to the first direction, each of the receive electrodes comprising:
a bar extending generally in the second direction, the bar crossing over one second portion of each of the plurality of drive electrodes that connects adjacent diamond-shaped first portions in the first direction to form a uniform grid of diamond-shaped first portions of the plurality of drive electrodes, wherein the bar comprises a plurality of cross bars extending at regular intervals in opposite directions away from the bar in the first direction such that each of the plurality of cross bars is disposed above a diamond-shaped first portion of one of the plurality of drive electrodes, below a diamond-shaped first portion of one of the plurality of drive electrodes, or between diamond-shaped first portions of two of the plurality of drive electrodes; and a second plurality of projections, each of the second plurality of projections extending from the bar and from each of the plurality of cross bars, wherein the bar, the plurality of cross bars, and the plurality of second projections form a snowflake pattern in the uniform grid of diamond-shaped first portions of the plurality of drive electrodes, wherein the second plurality of projections comprises a plurality of first pairs of projections, each of the first pairs of projections extending from a first side of the bar at regular intervals, a plurality of second pairs of projections, each of the second pairs of projections extending from a second side of the bar at regular intervals, a plurality of third pairs of projections, each of the third pairs of projections extending from opposite sides of each of a first plurality of the plurality of cross bars, and a plurality of fourth pairs of projections, each of the fourth pairs of projections extending from opposite sides of each of a second plurality of the plurality of cross bars, such that the first, second, third, and fourth pairs of projections are respectively disposed above respective diamond-shaped first portions of one of the plurality of drive electrodes, below respective diamond-shaped first portions of one of the plurality of drive electrodes, or between respective diamond-shaped first portions of two of the plurality of drive electrodes, and each projection of the first plurality of projections of each of the plurality of diamond-shaped first portions is interleaved between two projections of the second plurality of projections, and wherein each of the first plurality of projections and each of the second plurality of projections has a same width.

11. The device of claim 10 wherein, in plan view, the plurality of drive electrodes and the plurality of receive electrodes are substantially non-overlapping.

12. The device of claim 10 and further comprising a plurality of fill areas, a first fill area respectively separating, in plan view, the first plurality of projections of each of the drive electrodes and the second plurality of projections of each of the plurality of receive electrodes.

13. The device of claim 10 wherein, in plan view, the first plurality of projections and the second plurality of projections provide an increased adjacent perimeter between a first drive electrode and a first receive electrode.

14. The device of claim 10 wherein the plurality of drive electrodes includes at least one resistively interpolated drive electrode.

15. The device of claim 10 wherein each second portion comprises a thin metal track.

16. A touchscreen device comprising:
a plurality of drive electrodes extending generally in a first direction, each of the drive electrodes comprising:
a plurality of diamond-shaped first portions, each diamond-shaped first portion connected to an adjacent diamond-shaped first portion in the first direction by at least one second portion extending from at least one end of each diamond-shaped first portion,
wherein each of the plurality of diamond-shaped first portions comprises a first plurality of projections, each projection of the first plurality of projections extending orthogonally from a respective side of a respective one of the diamond-shaped first portions;
a plurality of drive lines coupled to selected drive electrodes;
a plurality of receive electrodes extending generally in a second direction transverse to the first direction, each of the receive electrodes comprising:
a bar extending generally in the second direction, the bar crossing over one second portion of each of the plurality of drive electrodes that connects adjacent diamond-shaped first portions in the first direction to form a uniform grid of diamond-shaped first portions of the plurality of drive electrodes,
wherein the bar comprises a plurality of cross bars extending at regular intervals in opposite directions away from the bar in the first direction such that each of the plurality of cross bars is disposed above a diamond-shaped first portion of one of the plurality of drive electrodes, below a diamond-shaped first portion of one of the plurality of drive electrodes, or between diamond-shaped first portions of two of the plurality of drive electrodes; and
a second plurality of projections, each of the second plurality of projections extending from the bar and from each of the plurality of cross bars,
wherein the bar, the plurality of cross bars, and the plurality of second projections form a snowflake pattern in the uniform grid of diamond-shaped first portions of the plurality of drive electrodes;
a plurality of receive lines, each receive line respectively coupled to one of the receive electrodes; and
a controller coupled to the plurality of drive lines and to the plurality of receive lines,
wherein the second plurality of projections comprises a plurality of first pairs of projections, each of the first pairs of projections extending from a first side of the bar at regular intervals, a plurality of second pairs of projections, each of the second pairs of projections extending from a second side of the bar at regular intervals, a plurality of third pairs of projections, each of the third pairs of projections extending from opposite sides of each of a first plurality of the plurality of cross bars, and a plurality of fourth pairs of projections, each of the fourth pairs of projections extending from opposite sides of each of a second plurality of the plurality of cross bars, such that the first, second, third, and fourth pairs of projections are respectively disposed above respective diamond-shaped first portions of one of the plurality of drive electrodes, below respective diamond-shaped first portions of one of the plurality of drive electrodes, or between respective diamond-shaped first portions of two of the plurality of drive electrodes, and each projection of the first plurality of projections of each of the plurality of diamond-shaped first portions is interleaved between two projections of the second plurality of projections.

17. The device of claim 16 and further comprising a plurality of fill areas, a first fill area respectively separating, in plan view, the first plurality of projections of each of the drive electrodes and the second plurality of projections of each of the plurality of receive electrodes.

18. The device of claim 16 wherein, in plan view, the first plurality of projections and the second plurality of projections provide an increased adjacent perimeter between a first drive electrode and a first receive electrode.

19. The device of claim 16 wherein the plurality of drive electrodes includes at least one resistively interpolated drive electrode.

20. The device of claim 16 wherein the plurality of drive electrodes are disposed in a drive electrode layer and the plurality of receive electrodes are disposed in a receive electrode layer, and further comprising an intermediate dielectric layer disposed between the drive electrode layer and the receive electrode layer.

21. A touchscreen device comprising:
a plurality of drive electrodes extending generally in a first direction, each of the drive electrodes comprising:
a plurality of diamond-shaped first portions, each diamond-shaped first portion connected to an adjacent diamond-shaped first portion in the first direction by at least one second portion extending from at least one end of each diamond-shaped first portion,
wherein each of the plurality of diamond-shaped first portions comprises a first plurality of projections, each projection of the first plurality of projections extending orthogonally from a respective side of a respective one of the diamond-shaped first portions; and
a plurality of drive lines, each of the drive lines respectively coupled to one of the drive electrodes;
a plurality of receive electrodes extending generally in a second direction transverse to the first direction, each of the receive electrodes comprising:
a bar extending generally in the second direction, the bar crossing over one second portion of each of the plurality of drive electrodes that connects adjacent diamond-shaped first portions in the first direction to form a uniform grid of diamond-shaped first portions of the plurality of drive electrodes,
wherein the bar comprises a plurality of cross bars extending at regular intervals in opposite directions away from the bar in the first direction such that each of the plurality of cross bars is disposed above a diamond-shaped first portion of one of the plurality of drive electrodes, below a diamond-shaped first portion of one of the plurality of drive electrodes, or between diamond-shaped first portions of two of the plurality of drive electrodes; and
a second plurality of projections, each of the second plurality of projections extending from the bar and from each of the plurality of cross bars,
wherein the bar, the plurality of cross bars, and the plurality of second projections form a snowflake pattern in the uniform grid of diamond-shaped first portions of the plurality of drive electrodes;

a plurality of receive lines coupled to selected receive electrodes; and a controller coupled to the plurality of drive lines and to the plurality of receive lines, wherein the second plurality of projections comprises a plurality of first pairs of projections, each of the first pairs of projections extending from a first side of the bar at regular intervals, a plurality of second pairs of projections, each of the second pairs of projections extending from a second side of the bar at regular intervals, a plurality of third pairs of projections, each of the third pairs of projections extending from opposite sides of each of a first plurality of the plurality of cross bars, and a plurality of fourth pairs of projections, each of the fourth pairs of projections extending from opposite sides of each of a second plurality of the plurality of cross bars, such that the first, second, third, and fourth pairs of projections are respectively disposed above respective diamond-shaped first portions of one of the plurality of drive electrodes, below respective diamond-shaped first portions of one of the plurality of drive electrodes, or between respective diamond-shaped first portions of two of the plurality of drive electrodes, and each projection of the first plurality of projections of each of the plurality of diamond-shaped first portions is interleaved between two projections of the second plurality of projections.

22. The device of claim 21 and further comprising a plurality of fill areas, a first fill area respectively separating, in plan view, the first plurality of projections of each of the drive electrodes and the second plurality of projections of each of the plurality of receive electrodes.

23. The device of claim 21 wherein, in plan view, the first plurality of projections and the second plurality of projections provide an increased adjacent perimeter between a first drive electrode and a first receive electrode.

24. The device of claim 21 wherein the plurality of drive electrodes includes at least one resistively interpolated drive electrode.

25. The device of claim 21 wherein each second portion comprises a thin metal track.

\* \* \* \* \*